Dec. 24, 1946.        P. H. McKEE ET AL        2,413,061
                      TROLLEY WIRE CONNECTOR
           Filed July 21, 1944            2 Sheets-Sheet 1
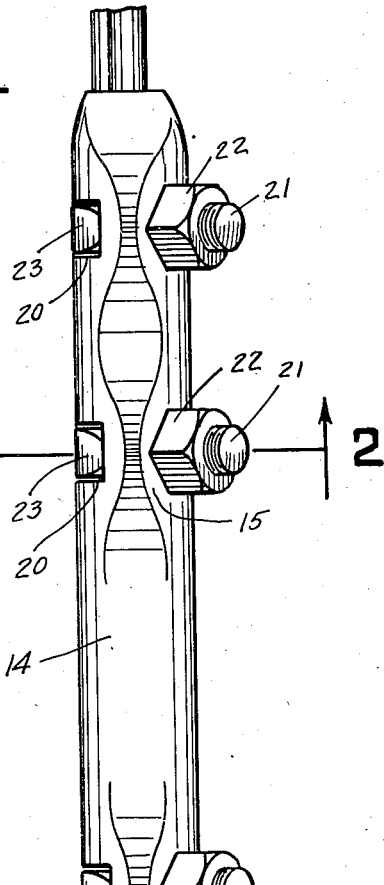
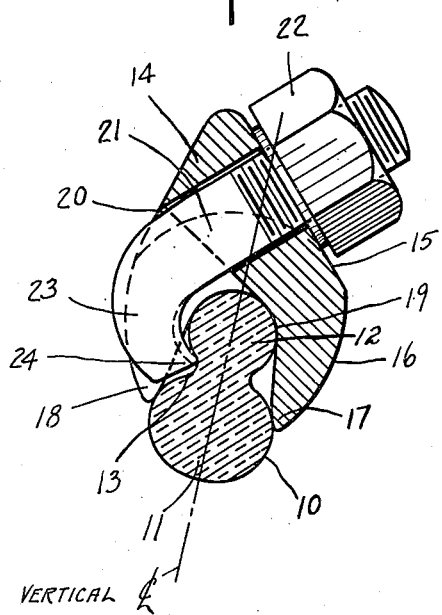
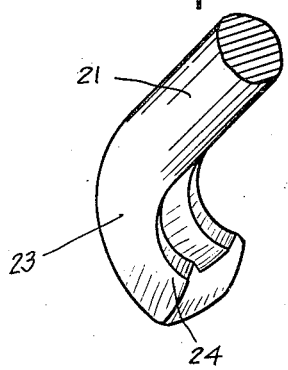
INVENTORS.
PAUL H. McKEE.
CLAY V. SILER.
BY
Lockwood, Goldsmith & Galt.
ATTORNEYS.

Dec. 24, 1946.   P. H. McKEE ET AL   2,413,061
TROLLEY WIRE CONNECTOR
Filed July 21, 1944    2 Sheets-Sheet 2
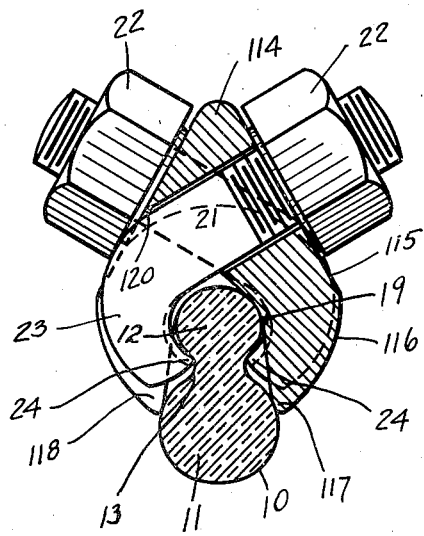
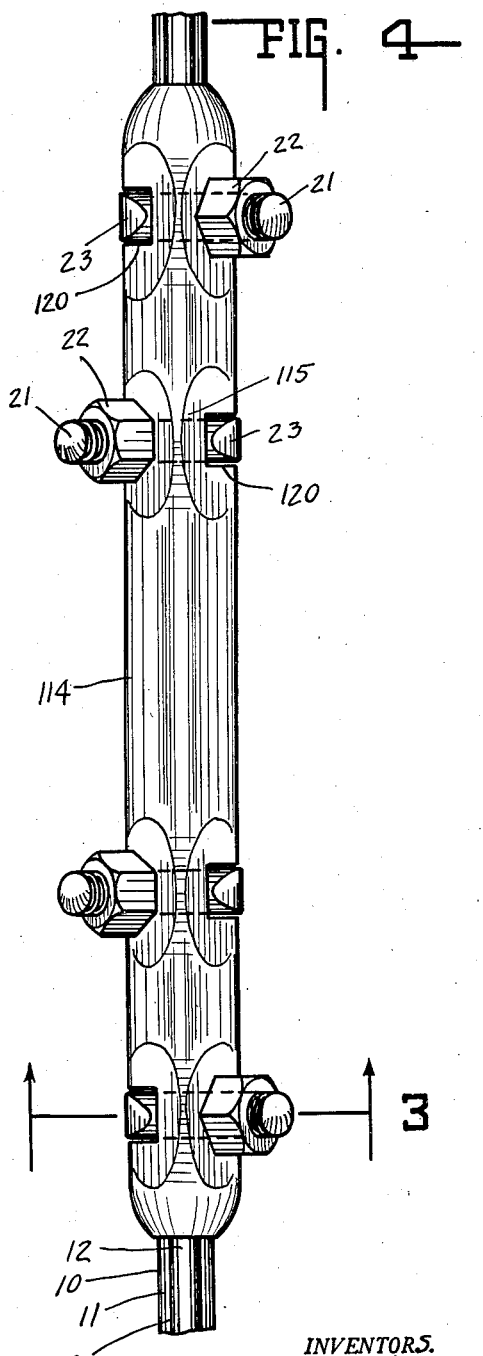
INVENTORS.
PAUL H. McKEE.
CLAY V. SILER.
BY
Lockwood, Goldsmith & Galt
ATTORNEYS.

Patented Dec. 24, 1946

2,413,061

UNITED STATES PATENT OFFICE 2,413,061

TROLLEY WIRE CONNECTOR

Paul H. McKee and Clay V. Siler,
Terre Haute, Ind.

Application July 21, 1944, Serial No. 545,908

3 Claims. (Cl. 191—44.1)

This invention relates to trolley wire connectors, such as splicers, frogs, hangers or the like, being especially adapted for connecting trolley wires known as "figure 8" and round grooved wires.

The figure 8 or grooved trolley wire is so formed that it may be supported and spliced by engaging and clamping means well above the trolley engaging surface. Various forms and types of splicers or wire connectors have been employed for splicing or connecting the ends of this type of trolley wire. However, those connectors heretofore employed have several disadvantages in that they are generally formed to require the ends of the trolley wire to be inserted through the opposite ends of the connector with a fairly close sliding fit so that inwardly formed longitudinal shoulders in the connector will slide in the side grooves formed in the figure 8 wire and thereby interlock. Such connectors also carry interlocking set screws provided with sharp ends, such as to bite into the metal of the wire and thereby lock the connector and wire in their sliding interconnection. In general, such types of connectors are designed so that their body formation interlocks with the groove in the wire, but the clamping and locking action is downwardly against the wire, tending to force the wire from the connector.

One objection to this arrangement is the difficulty and awkwardness in attempting to slide the free ends of the trolley wire into the opposite ends of the connector. This is an awkward operation due to some extent to the stiffness of the trolley wire. Where there is a slightest bend or kink in the wire, great difficulty is had in sliding the wire into the connector.

It is the purpose of this invention to provide a trolley wire connector, such as a splicer, frog or hanger, for grooved wires which may be set down over the wire and then clamped in place, requiring no longitudinal sliding of the wire into the connector. Thus, the connector may be set down over one free end of the wire and clamped thereto and then set over the opposed end or ends of the wire and clamped thereon. The wire may be laid into the bottom of the connector instead of being inserted endwise therein. This is accomplished by providing the connector with a bottom channel sufficiently wide to receive the upper section of the grooved wire, the internal width of the groove being slightly greater than the diameter of that section. The wire is then clamped within the groove by a series of angularly disposed draw bolts having curved clamping jaws formed and arranged to extend about and under the upper section of the wire to draw it upwardly into the channel of the connector to lock it therein.

This structure additionally has the advantage of pulling the wire and connector together through the medium of the draw bolts instead of tending to force them apart, as is the case in the locking bolts of the prior structures above referred to.

Another advantage resides in the fact that such connectors permit simplified casting of a U-channel without any inwardly extending shoulder or lip, at the same time permitting the inner surface of the U-channel to be conveniently ground finished to improve the electrical connection between the wire and connector. Thus, wherein the connector is formed with longitudinal lips or shoulders engaging in the longitudinal recesses of the grooved wire, the casting is rendered more difficult and there is presented the problem of grinding a suitable finish for the most efficient electrical contact.

Another feature of the invention resides in the angular arrangement and formation of the "J-hook" draw bolts with respect to the body of the connector and the wire, as distinguished from other types such as set screws having threaded engagement with the body of the connector, which upon continued use corrode and become irremovably locked so that the only method of removal is to cut them off.

The full nature of the invention will be understood from the accompanying drawings and the following description and claims:

Fig. 1 is a top plan view showing the connector applied to a trolley wire as a splicer.

Fig. 2 is a section taken on the line 2—2 of Fig. 1.

Fig. 2—A is a perspective view of the clamping end of one of the draw bolts.

Fig. 3 is a section taken on the line 3—3 of Fig. 4, while Fig. 4 is the same as Fig. 1, showing a modified form of the connector.

In the drawings there is shown a trolley wire indicated at 10 of the figure 8 type formed in cross section with a trolley engaging portion 11 and a clamping portion 12 of less radius. Intermediate the portions 11 and 12 there are formed inwardly directed grooves 13 to provide clamping shoulders.

The connector herein shown comprises a splicer formed of a longitudinal casting 14 of suitable conducting material. The upper portion of the casting is angularly formed of inverted V-shape to provide angularly disposed upper side surfaces indicated at 15. The lower portion of the casting is formed with inwardly directed side walls 16 terminating in a bearing lip 17 on one side thereof, which is spaced from the opposite side or opposed bearing indicated at 18, to provide an inverted U-shaped channel indicated at 19 for receiving the portion 12. The channel 19 is of slightly greater width than the portion 12 of the wire so that the connector may be set down directly over the wire.

Extending at a downward angle through the side wall 15 and at spaced intervals longitudinally of the connector there are openings 20 through which the shank 21 of the clamping draw bolts extend. Each of said draw bolts is threaded to receive a nut 22 to engage the side wall 15. The opposite ends of the draw bolts are curved inwardly at 23 to form an engaging and clamping jaw portion. The jaw portion is arranged to engage under the shoulder of the portion 12 of the trolley wire and within the recessed portion 13 thereof so as to draw the wire upwardly into the channel 19 of the connector and cause the serrations 24 to bite into the wire to retain it against endwise slippage.

In applying the connector as a trolley wire splicer, the connector is mounted over abutting ends of the wire so that the portion 12 of the wire seats within the channel 19. The draw bolts 21 are then drawn in by the nuts 22 until they engage under the portion 12 of the wire and draw it upwardly into the connector in clamping engagement therewith and with the serrations 24 buried in the wire. The advantage of the connector shown in Figs. 1 and 2 is that all the nuts for tightening up the draw bolts are on one side of the connector so that the operator may manipulate them from one side without shifting to the other side during the connecting or disconnecting operation, and also to give more clearance for the trolley wheel.

In Figs. 3 and 4, a similar connector is illustrated, but with the draw bolts in opposed relation, the draw bolts at each end of the connector being oppositely disposed. Thus, there is shown a connector 114 having angularly disposed upper side walls 115 and inwardly curved lower surfaces 116 which with the opposed side wall 118 embraces the channel 19. Similar bolts 21 are employed in the manner above described, but wherein they extend oppositely to each other through the connector so that their clamping ends 24 engage and clamp opposite sides of the wire to draw the portion 12 thereof upwardly into and lock it within the channel 19.

While the connector is herein shown and described as a trolley wire splicer for connecting sections of trolley wire together, the same structural principle may be employed wherein it serves as a hanger or a frog, for providing overhead support for a trolley wire and connecting end branch wires respectively.

The invention claimed is:

1. A connector for grooved trolley wires comprising an elongated body portion having a channel coextensive therewith in the under surface thereof for freely receiving the upper portion of the wire therein, said body portion of the connector being provided with a series of openings extending at an angle therethrough from the upper surface on one side to the lower surface on the opposed side, a draw bolt extending through each of said angularly disposed openings slidable therein having a hook-like clamping portion extending into said channel for clamping engagement under the upper portion of the wire extending therethrough, and a nut having threaded engagement with the opposite end of said draw bolt in engagement with the angular upper surface of said body portion to draw said bolt upwardly at an angle to clamp the wire within said channel.

2. A connector for grooved trolley wires, comprising an elongated body portion having a channel coextensive therewith and of greater width than that portion of the trolley wire above the groove for freely straddling the grooved portion of the trolley wire, and a series of draw bolts extending at an angle through the body portion of said connector having inwardly curved ends for providing hook-like clamping portions engageable in the groove of the wire under the upper portion thereof to draw it upwardly into said channel and clamp it therein.

3. A connector for grooved trolley wires, comprising an elongated body portion having a channel coextensive therewith and of greater width than that portion of the trolley wire above the groove for freely straddling the grooved portion of the trolley wire, and a plurality of oppositely directed draw bolts extending angularly through the body portion of said connector, each of said bolts being provided with an inwardly curved hook-like clamping portion extending into the opposed grooves of said wire for engagement with the under surface of the upper portion thereof to clamp said wire from opposite sides and draw it upwardly into said channel and thereby support it in locked engagement with said connector.

PAUL H. McKEE.
CLAY V. SILER.